P. SHELLENBACK.
Combination Lock.
No. 201,955. Patented April 2, 1878.
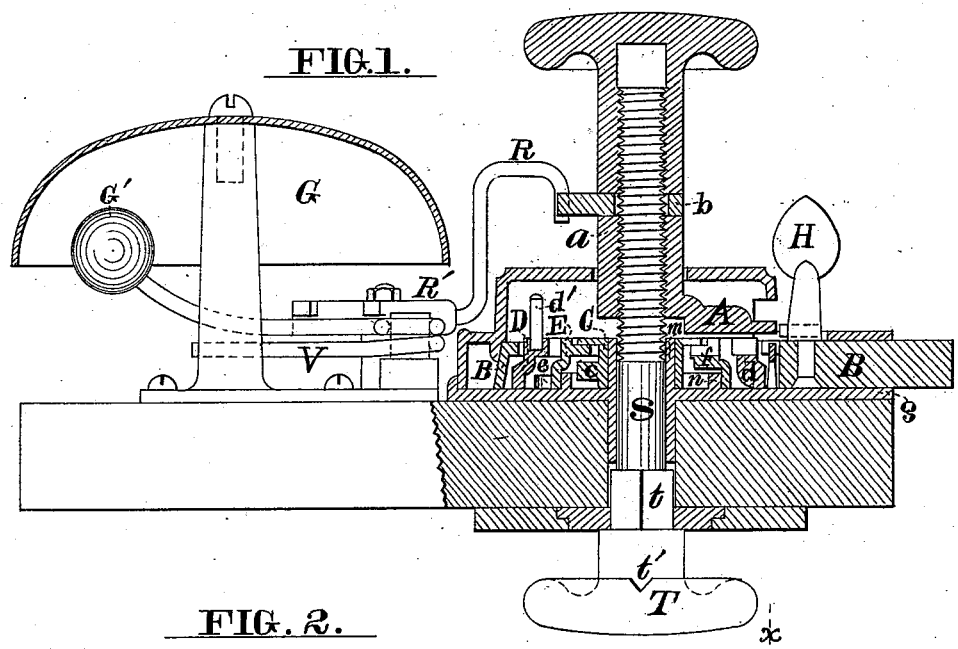
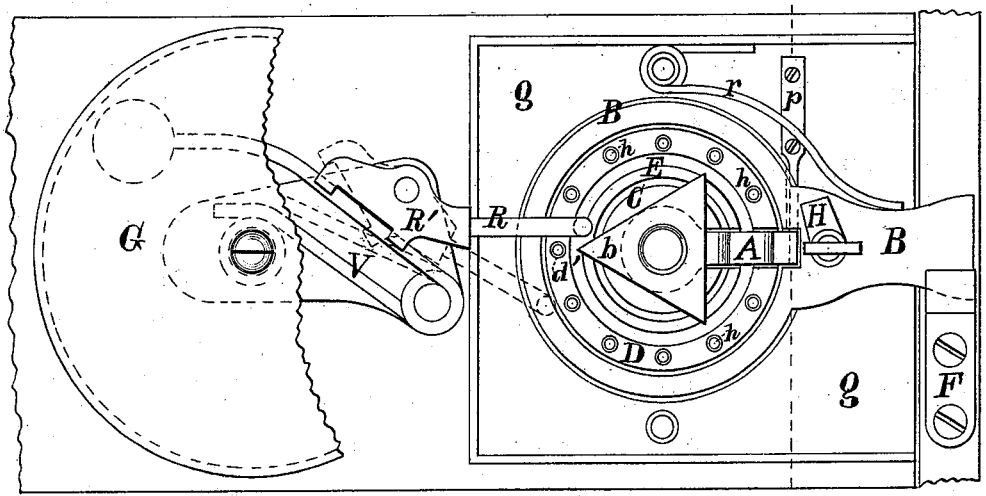
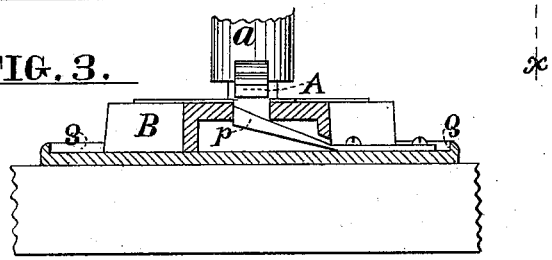
Witnesses
Aulla J. Smith
J. R. Sites
Inventor
Peter Shellenback
By
Attorneys

UNITED STATES PATENT OFFICE.

PETER SHELLENBACK, OF HAMILTON, OHIO, ASSIGNOR OF ONE-HALF HIS RIGHT TO WILLIAM E. DRAYER, OF SAME PLACE.

IMPROVEMENT IN COMBINATION-LOCKS.

Specification forming part of Letters Patent No. 201,955, dated April 2, 1878; application filed May 8, 1877.

*To all whom it may concern:*

Be it known that I, PETER SHELLENBACK, of the city of Hamilton, county of Butler, and State of Ohio, have invented certain new and useful Improvements in Combined Lock and Alarm; and I declare that the following is a full, clear, and exact description thereof, reference being had to the accompanying drawing, which forms a part of this specification.

My invention is an improvement on the combined lock and alarm patented by me March 14, 1876, No. 174,742; and consists, first, in a new construction of the lock and arrangement of the rings and lock-case, as hereinafter described; second, in the use of a small spring, $p$, to prevent any possibility of moving the bolt until all the notches in the rings have been brought into line.

Figure 1 is a sectional elevation of the lock and alarm; Fig. 2, a plan of the same; and Fig. 3, a section through the line $x\,x$, to show the application of the small spring $p$.

A is the driver, by means of which the rings are brought into position and the bolt operated. B is the bolt, circular in form, and operating in a similar manner to that described in my previous patent. C is the inner ring, bored to fit snugly about the central boss $m$. D is the outer ring, in which is a pin, $d'$. The contact of the driver with the pin $d'$ sets the rings. A series of holes, $h$, are arranged in the circumference of the ring D, allowing the position of the pin $d'$ to be changed, and thereby changing the combination. This arrangement is not new. E is the central ring, surrounding the annular ledge $n$ on the plate $g$, and held in position by a projection on the upper edge of the ring C.

Each ring, it will be seen, has an independent bearing on the plate $g$, and the motion of one does not influence the others by friction between them.

The rings are brought into position for operating the bolt in the following manner: The spindle S being turned, the driver A is brought into contact with the pin $d'$ in the ring D. The ring D is then moved, bringing the lug $d$ on the ring D into contact with the lug $e$ on the ring E. The ring E is then moved in its turn until the lug $f$ on it is brought into contact with the lug $c$ on the ring C. The ring C is then moved until the letters or figures on the dial indicate that the notch in it has been brought into its proper position, as has been fully described in my previous patent. The driver A is then turned in the opposite direction until the notch in the ring E is brought into position. A third movement finally brings the notch in the ring D into position. The notches in the rings now being in line, the tongue of the driver passes through them, and enters the notch in the bolt, and the latter is then thrown.

H is a thumb-button for preserving the combination, as described and claimed in my former patent.

A small spring, $p$, is attached to the plate $g$, and enters the notch in the bolt B, as shown in Fig. 3. Its object is to prevent any possibility of the bolt being thrown until all the notches in the rings have been brought into line. When that is effected, in the manner already shown, the driver A enters the notch and depresses the spring $p$, allowing the bolt to be thrown. The small spring $r$ forces the bolt back into the catch after being lifted and released.

The bell-hammer G' is attached to the spring V, and is operated through the wire R and pallet R' by means of the hub $b$ on the spindle S. The hub $b$ is cast separate from the driver, and placed outside the lock-casing. Coming in contact with the wire R, the pallet R' compresses the spring V until the hub passes and releases the wire R. The spring V then flies back, causing the hammer to strike the gong.

When it is desired to operate the lock without striking the alarm, the wire R and pallet R' may be turned out of position, as shown in dotted lines in Fig. 2.

On the outer knob is a notch, $t'$, by means of which the combination may be set at night by the sense of touch. The rings are brought into position by complete and by quarter revolutions of the spindle. By placing one finger on the notch, it may be known when the spindle has been turned the right distance to set the notches in the rings in position, and thus the lock may be operated when it is impossible to see the figures or letters on the dial.

A projection on the knob, or any other similar device, may be used instead of the notch $t'$ in the knob.

Having thus fully described my improvement, what I claim as new, and desire to secure by Letters Patent, is—

1. The rings C D E, seated upon a base-plate, $g$, each having an independent bearing, free from friction with each other, in combination with the spindle S, driver A, and bolt B, constructed, arranged, and operated substantially as shown and described.

2. In a combination-lock in which the rings are brought into position for operating the lock by quarter and half revolutions of the knob-spindle, the combination of the rings C D E, driver A, spindle S, and knob T, the latter having a notch or other mark, so that, by the sense of touch, the spindle may be turned to bring the rings into position, substantially as shown and described.

3. The combination of the spring $p$ with the bolt B and driver A, to prevent the throwing of the bolt until the rings are brought into position, substantially as shown and described.

PETER SHELLENBACK.

Witnesses:
R. C. McKINNEY,
CULLA J. SMITH.